United States Patent
Chen et al.

(10) Patent No.: US 11,023,024 B1
(45) Date of Patent: Jun. 1, 2021

(54) VOLTAGE REGULATOR CONFIGURATION SYSTEM

(71) Applicant: Dell Products L.P., Round Rock, TX (US)

(72) Inventors: Chih-Chung Chen, New Taipei (TW); Feng-Yu Wu, Taipei (TW); Gin-Yen Yang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/781,687

(22) Filed: Feb. 4, 2020

(51) Int. Cl.
*G06F 1/26* (2006.01)
*G06F 9/4401* (2018.01)
*G06F 13/42* (2006.01)
*G06F 13/20* (2006.01)

(52) U.S. Cl.
CPC .............. *G06F 1/26* (2013.01); *G06F 9/4401* (2013.01); *G06F 13/20* (2013.01); *G06F 13/4282* (2013.01); *G06F 2213/0016* (2013.01)

(58) Field of Classification Search
CPC .......... G06F 1/26; G06F 9/4401; G06F 13/20; G06F 13/4282; G06F 2213/0016
See application file for complete search history.

(56) References Cited

U.S. PATENT DOCUMENTS

| | | | |
|---|---|---|---|
| 9,612,603 B2 | 4/2017 | Richards, III et al. | |
| 9,612,638 B1 | 4/2017 | Berke et al. | |
| 2012/0054503 A1* | 3/2012 | Hsiao | G06F 1/3296 713/300 |
| 2013/0067250 A1* | 3/2013 | Wu | G06F 1/08 713/300 |
| 2015/0149796 A1* | 5/2015 | Muljono | G06F 1/3296 713/320 |
| 2015/0280563 A1* | 10/2015 | Tang | H02M 3/1584 323/271 |
| 2015/0310331 A1* | 10/2015 | Rolston | G06N 5/025 700/298 |
| 2017/0147050 A1* | 5/2017 | Berke | G06F 1/26 |
| 2018/0088647 A1* | 3/2018 | Suryanarayanan | G06F 1/26 |
| 2018/0335822 A1* | 11/2018 | Mirjafari | G11C 5/147 |
| 2019/0045358 A1* | 2/2019 | Ahmed | H04W 12/06 |
| 2019/0129868 A1* | 5/2019 | Jiang | H02M 3/04 |

FOREIGN PATENT DOCUMENTS

WO WO-2017003482 A1 * 1/2017 ............... G06F 1/26

* cited by examiner

*Primary Examiner* — Glenn A. Auve
(74) *Attorney, Agent, or Firm* — Haynes and Boone, LLP (57) ABSTRACT

A voltage regulator configuration system includes a voltage regulator module that is coupled to a processing system and that is configured to provide a voltage to the processing system. A Basic Input/Output System (BIOS) that is also coupled to the processing system and the BIOS identifies a processing system mode in which the processing system is operating and identifies a voltage regulator module configuration for the voltage regulator module based on the processing system mode. The BIOS transmits a voltage regulator module configuration command that includes the voltage regulator module configuration to a remote access controller. The remote access controller configures the voltage regulator module with the voltage regulator module configuration.

20 Claims, 6 Drawing Sheets

VOLTAGE REGULATOR CONFIGURATION SYSTEM

BACKGROUND

The present disclosure relates generally to information handling systems, and more particularly to configuring a voltage in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, desktop computing devices, laptop computing devices, tablet computing devices, mobile phones, and/or other computing devices known in the art, may include a central processor having one or more cores. For example, when computing devices are manufactured, some computing devices may include a central processor having, for example, six cores, while other computing devices may include a central processor having, for example, eight cores. Furthermore, some central processors may include processing modes that are configured to cause the central processor to operate the maximum number of cores included in that central processor, or operate a number of cores that is less than that maximum number of cores. Each of these central processor core configurations may require a different output voltage profile from a voltage regulator module in the computing device that is defined by a load-line constant, which is dependent on the number of cores included in the central processor. However, conventional voltage regulators modules include voltage regulator module firmware that supports only one type of central processor core configuration at a time. Thus, when manufacturing the computing device, conventional voltage regulator modules require the particular voltage regulator module firmware version that supports the output voltage profile for the particular central processor that is installed in that computing device, and/or the particular mode in which that particular central processor is operating. In some computing devices, the Basic Input/Output System (BIOS) may be configured (e.g., with an INTEL® compatibility software kit available from INTEL® corporation of Santa Clara, Calif., United States) to configure the central processor to dynamically control the output voltage of the voltage regulator module to meet the operating requirements for the central processor core configuration. However, this solution impacts the performance of the central processor by increasing its power consumption and decreasing its efficiency due to the need for the central processor to continuously process the dynamic output voltage control workload provided by the BIOS.

Accordingly, it would be desirable to provide an voltage regulator module configuration system that addresses the issues discussed above.

SUMMARY

According to one embodiment, an Information Handling System (IHS) includes a Basic Input/Output System (BIOS) processing system; and a BIOS memory system that is coupled to the BIOS processing system and that includes instructions that, when executed by the processing system, causes the BIOS processing system to provide a BIOS that is configured, during a boot process, to: identify a central processing system mode in which a central processing system coupled to the BIOS will operate; identify, based on the central processing system mode, a voltage regulator module configuration for a voltage regulator module that is coupled to the central processing system; and transmit, to a remote access controller that is coupled to the central processing system, a voltage regulator module configuration command that includes the voltage regulator module configuration, wherein the voltage regulator module configuration command is configured to cause the remote access controller to configure the voltage regulator module with the voltage regulator module configuration.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
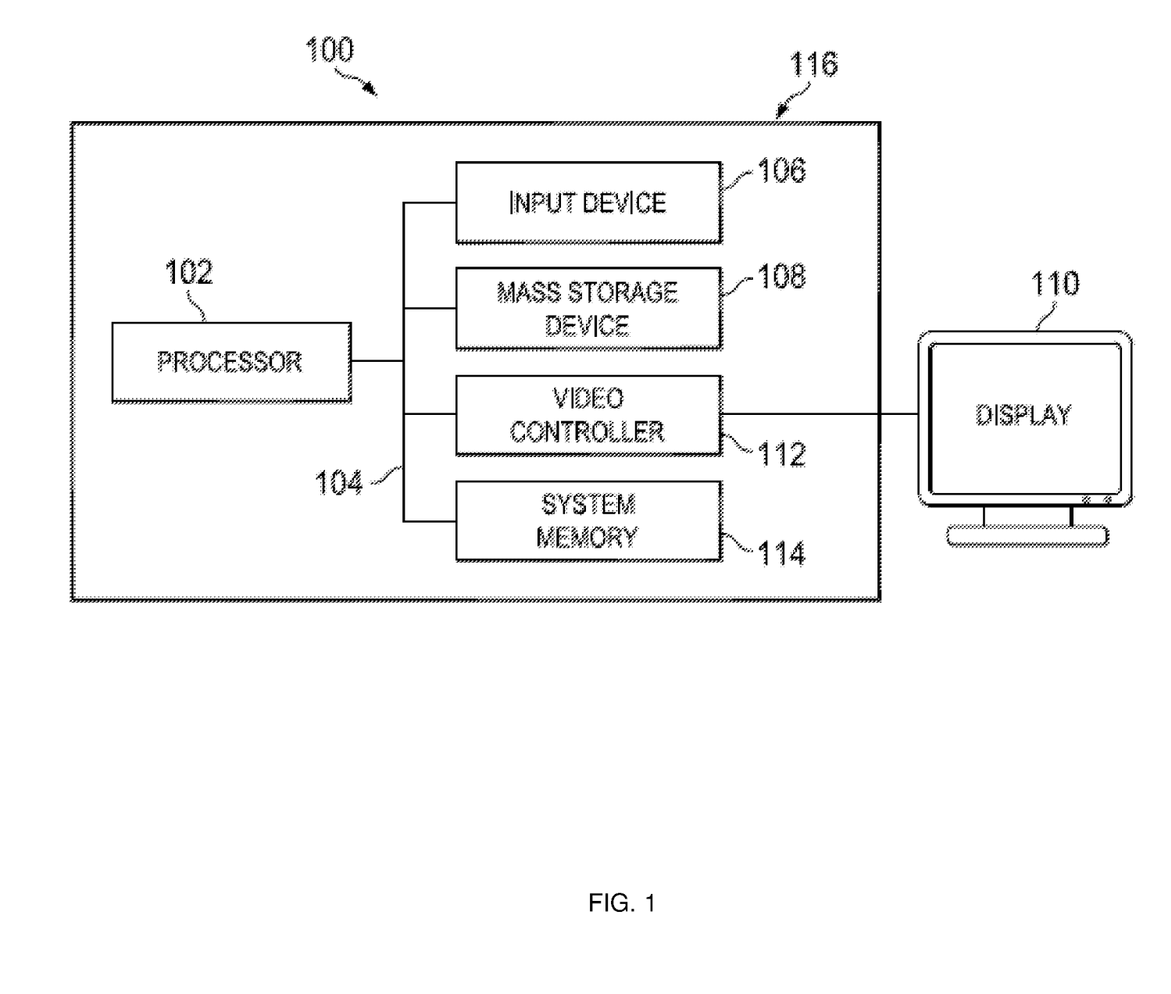
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
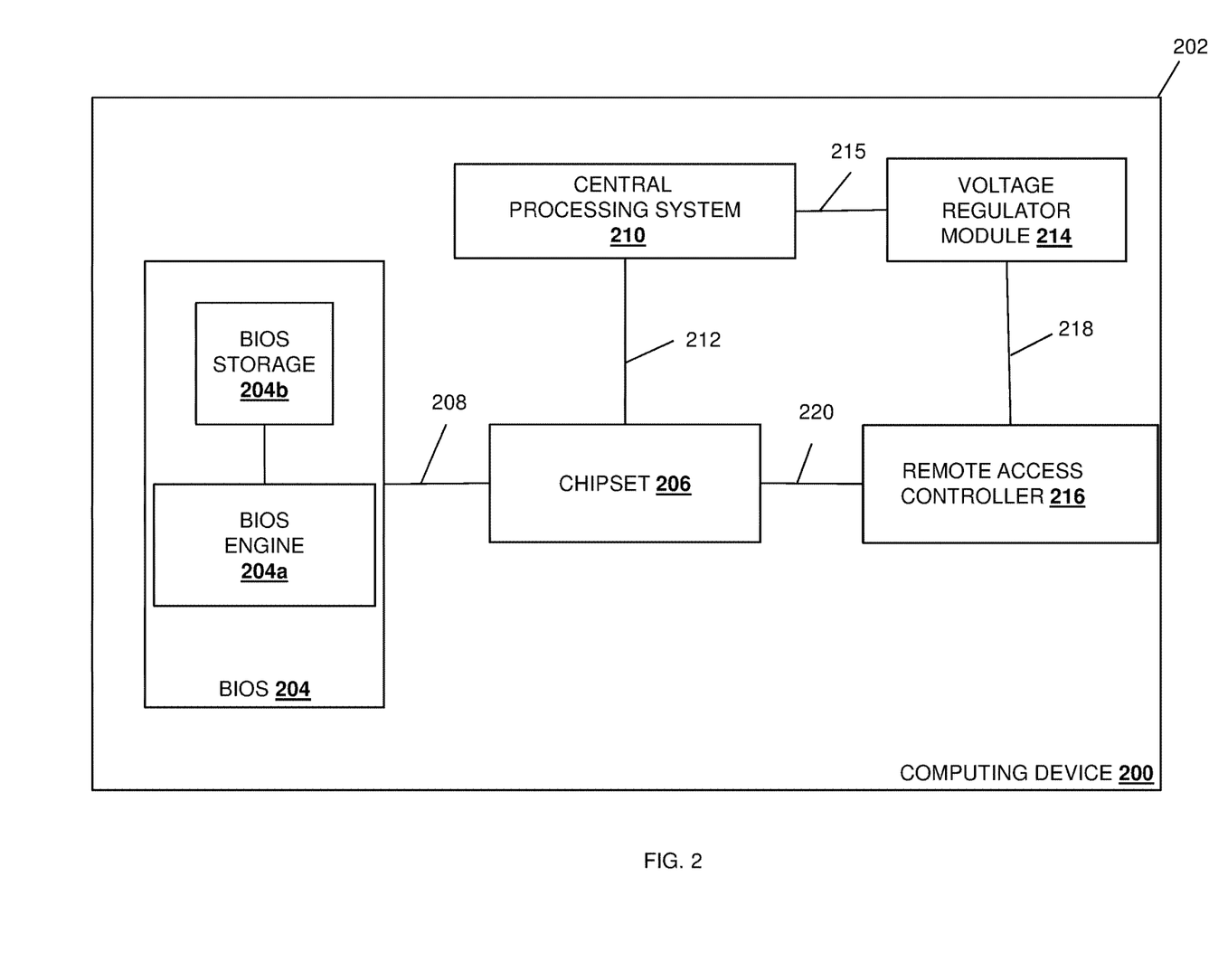
FIG. 2 is a schematic view illustrating an embodiment of a computing device that includes a voltage regulator configuration system provided according to the teachings of the present disclosure.

Referring now to FIG. 2, an embodiment of a computing device 200 is illustrated that includes the voltage regulator configuration system of the present disclosure. In the illustrated embodiment, the computing device 200 may be provided by the IHS 100 discussed above with reference to FIG. 1 and/or may include some or all of the components of the IHS 100, and in specific examples may be provided by server computing devices, desktop computing devices, laptop/notebook computing devices, tablet computing devices, and/or other computing devices that would be apparent to one of skill in the art in possession of the present disclosure. However, while illustrated and discussed as being provided by a server device in some of the embodiments below, one of skill in the art in possession of the present disclosure will recognize that the functionality of the computing device 200 discussed below may be provided by a variety of other computing devices that are configured to operate similarly as the computing device 200 discussed below. In the illustrated embodiment, the computing device 200 includes a chassis 202 that houses the components of the computing device 200, only some of which are illustrated in FIG. 2. For example, the chassis 202 may house a BIOS processing system (not illustrated, but which may include the processor 102 discussed above with reference to FIG. 1) and a BIOS memory system (not illustrated, but which may include the memory 114 discussed above with reference to FIG. 1) that includes instructions that, when executed by the BIOS processing system, cause the BIOS processing system to provide a Basic Input/Output System (BIOS) 204 that is configured to perform the functions of the BIOS and/or computing devices discussed below.

As would be appreciated by one of skill in the art in possession of the present disclosure, the BIOS may be provided by non-volatile firmware (e.g., provided by the combination of the BIOS processing system and BIOS memory system discussed above) that is configured to perform hardware initialization during a booting process for the computing device 200, as well as provide runtime services for operating systems and/or other programs/applications executed on the computing device 200. Furthermore, while referred to as a "BIOS", one of skill in the art in possession of the present disclosure will recognize that the BIOS 204 may be provided according to the Unified Extensible Firmware Interface (UEFI) specification and, as such, may include or be coupled to a software interface between an operating system provided by the computing device 200 and platform firmware included in the computing device 200. As such, the BIOS 204 may be provided by UEFI firmware that may include, for example, legacy support for BIOS services, while remaining within the scope of the present disclosure as well.

In the illustrated embodiment, the BIOS 204 includes a BIOS engine 204a that may be provided, for example, by the BIOS processing system discussed above via the execution of instructions included on the BIOS memory system discussed above. One of skill in the art in possession of the present disclosure will recognize that the BIOS engine 204a is illustrated and described herein as providing the voltage regulator configuration functionality of the present disclosure, and that the BIOS 204 may perform a variety of conventional BIOS functionality while remaining within the scope of the present disclosure. The BIOS 204 also includes a BIOS storage 204b that is coupled to the BIOS engine 204a (e.g., via a coupling between the BIOS storage 204b and the BIOS processing system), and that may store any of the information utilized by the BIOS engine 204a/BIOS 204 as discussed below (e.g., the voltage regulator configurations and/or any other BIOS information that would be apparent to one of skill in the art in possession of the present disclosure.) For example, the BIOS storage 204b may be provided by a BIOS Serial Peripheral Interface (SPI) flash storage device, although other storage subsystems will fall within the scope of the present disclosure as well.

The chassis 202 may also house a chipset 206 that is coupled to the BIOS engine 204a in the BIOS 204 (e.g., via a coupling 208 between the BIOS processing system and the chipset 206.) For example, the coupling 208 between the BIOS 204 and the chipset 206 may include a Low Pin Count (LPC) bus, an enhanced serial peripheral interface (eSPI) bus, and/or other buses that would be apparent to one of skill in the art in possession of the present disclosure. One of skill in the art in possession of the present disclosure will appreciate that in the embodiments discussed below, the chipset 206 is provided by a Platform Controller Hub (PCH) available from INTEL® corporation of Santa Clara, Calif., United States, although other chipsets and/or combinations of electronic components that manage data flow between a central processing system, memory system, and peripherals in the computing device 200 may benefit from the teachings of the present disclosure, and thus are envisioned as falling within its scope as well.

The chassis 202 may also house a central processing system 210 or Central Processing Unit (CPU) that is coupled to the BIOS engine 204a in the BIOS 204 (e.g., via a coupling 212 between the BIOS processing system and the central processing system 210 via the chipset 206 in the illustrated embodiment.) For example, the coupling 212 may include a Flexible Display Interface (FDI), a Direct Media Interface (DMI), and/or any other interfaces that one of skill in the art in possession of the present disclosure would recognize as being capable of providing the connection between the chipset 206 and the central processing system 210. In some examples, the central processing system 210 includes one or more central processing unit (CPU) cores. For example, the central processing system 210 may include 1 core, 2 cores, 4 cores, 6 cores, 8 cores, or any other number of cores in a core configuration that would be apparent to one of skill in the art in possession of the present disclosure.

As discussed above, each core configuration available for the central processing system 210 may require a unique voltage input from a voltage regulator module 214 that is included in the chassis 202 to operate, and that voltage regulator module 214 may be coupled to the central processing system 210 (e.g., via a coupling 215 between the voltage regulator module 214 and the central processing system 210). In various embodiments, the voltage regulator module 214 may be coupled to a power system (not illustrated, but which may be provided by a Power Supply Unit (PSU) and/or other power components that would be apparent to one of skill in the art in possession of the present disclosure) that is housed in the chassis 202 and that is coupled to a power source (not illustrated). As will be appreciated by one of skill in the art in possession of the present disclosure, the voltage regulator module 214 may receive electrical power from the power system at a first voltage (e.g., approximately 12 V Direct Current (DC) from a PSU) and regulate electrical power to provide at a lower voltage (e.g., approximately 1.0-2.0 V DC, or any other voltage that would be apparent to one of skill in the art in possession of the present disclosure, for use by the central processing system 210).

In the illustrated embodiment, the chassis 202 may also house a remote access controller (RAC) 216 such as, for example, an integrated DELL® Remote Access Controller (IDRAC) available from DELL® Inc. of Round Rock, Tex., United States. However, while a specific remote access controller is described below, one of skill in the art in possession of the present disclosure will appreciate that other Baseboard Management Controllers (BMCs) and/or other out-of-band controller devices may be utilized while remaining within the scope of the present disclosure. Furthermore, while illustrated as included in the computing device 200, one of skill in the art in possession of the present disclosure will recognize that the remote access controller 216 may be located outside of the computing device 200 and coupled to that computing device 200 (e.g., located in a server rack and coupled to a server device in that server rack) while remaining within the scope of the present disclosure as well. In the illustrated embodiment, the chassis 202 may house a RAC processing system (not illustrated, but which may include the processor 102 discussed above with reference to FIG. 1) and a RAC memory system (not illustrated, but which may include the memory 114 discussed above with reference to FIG. 1) that includes instructions that, when executed by the RAC processing system, cause the RAC processing system to provide the remote access controller 216 that is coupled to at least the chipset 206 (e.g., via a coupling 218 between the remote access controller 216 and the chipset 206) and the voltage regulator module 214 (e.g., via a coupling 220 between the remote access controller 216 and the voltage regulator module 214). For example, the coupling 218 may include the LPC bus and/or the eSPI bus discussed above, and the coupling 220 may include a Power Management Bus (PMBus) and/or an Inter-Integrated Circuit (I2C) bus. However, one of skill in the art in possession of the present disclosure will recognize other types of couplings and protocols may be utilized for the couplings 218 and 220 while remaining within the scope of the present disclosure as well.

In some embodiments, the remote access controller 216 may also include a network interface to provide an out-of-band network connection with a management device. Furthermore, in some embodiments, the remote access controller 216 may utilize one or more other buses to access one or more portions of computing device 200. For example, the remote access controller 216 may include and/or may provide power management, virtual media access, remote console capabilities, as well as other remote access controller functionality that may be available to a user via a web browser and/or a command line interface. As such, the remote access controller 216 may provide an administrator (e.g., the user) the ability to configure and/or maintain the computing device 200 as if the administrator were at a management console connected locally to the computing device 200 and/or has physical access to the computing device 200. However, while a specific computing device 200 has been illustrated, one of skill in the art in possession of the present disclosure in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
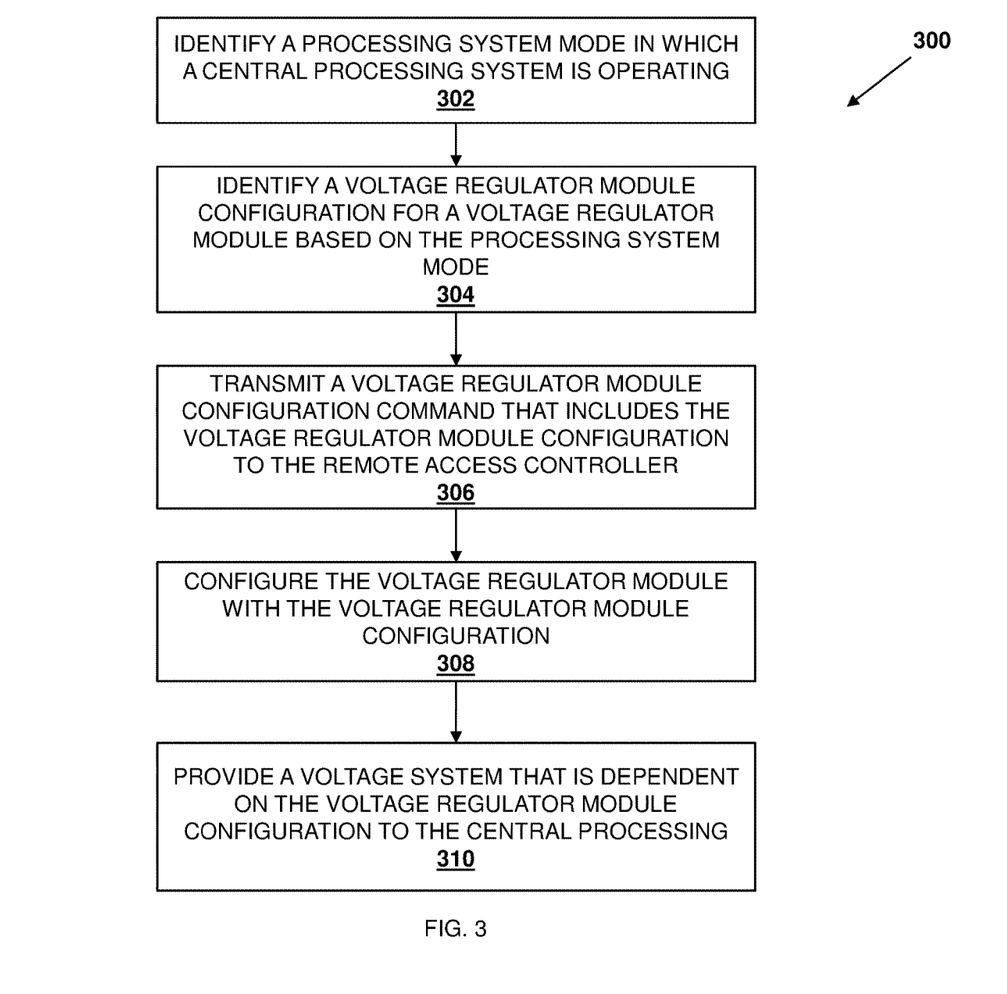
FIG. 3 is a flow chart illustrating an embodiment of a method for configuring a voltage regulator.

Referring now to FIG. 3, an embodiment of a method 300 for configuring a voltage regulator module in a computing device is illustrated. As discussed above, a computing device may include a first central processing system that includes a number of cores that is different than a number of cores that are included in a second central processing system that is available for installation in the computing device. Furthermore, in other situations, a central processing system may include different processing system modes such that only a portion of the maximum number of cores in the central processing system will operate in a first processing system mode, while the maximum number of cores in the central processing system will operate in a second central processing system mode. In conventional computing devices, in order to provide the correct voltage to the central processing system, either a particular voltage regulator must be installed in the computing device corresponding to the central processing system installed in that computing device, or the voltage regulator module must be controlled to output a voltage that is required for the central processing system installed in that computing device and/or the central processing system mode utilized by that central processing system. The systems and methods of the present disclosure include a BIOS that determines a processing system mode utilized by a central processing system, and then determines a voltage regulator configuration for that processing system mode. The BIOS may then provide that voltage regulator configuration to a remote access controller, and the remote access controller may access the voltage regulator module via a power management bus to configure the voltage regulator module with that voltage regulator configuration. As such, by using the BIOS and remote access controller as discussed above, the voltage regulator module may be configured during a boot of the computing device, and without the need to use the central processing system to continuously run a workload that adjusts the voltage of the voltage regulator as is provided in conventional computing devices. As a result, computing devices provided according to the teachings of the present disclosure may provide enhanced central processing system performance, reductions in power consumption, and/or other benefits that would be apparent to one of skill in the art in possession of the present disclosure.

Figure 4:
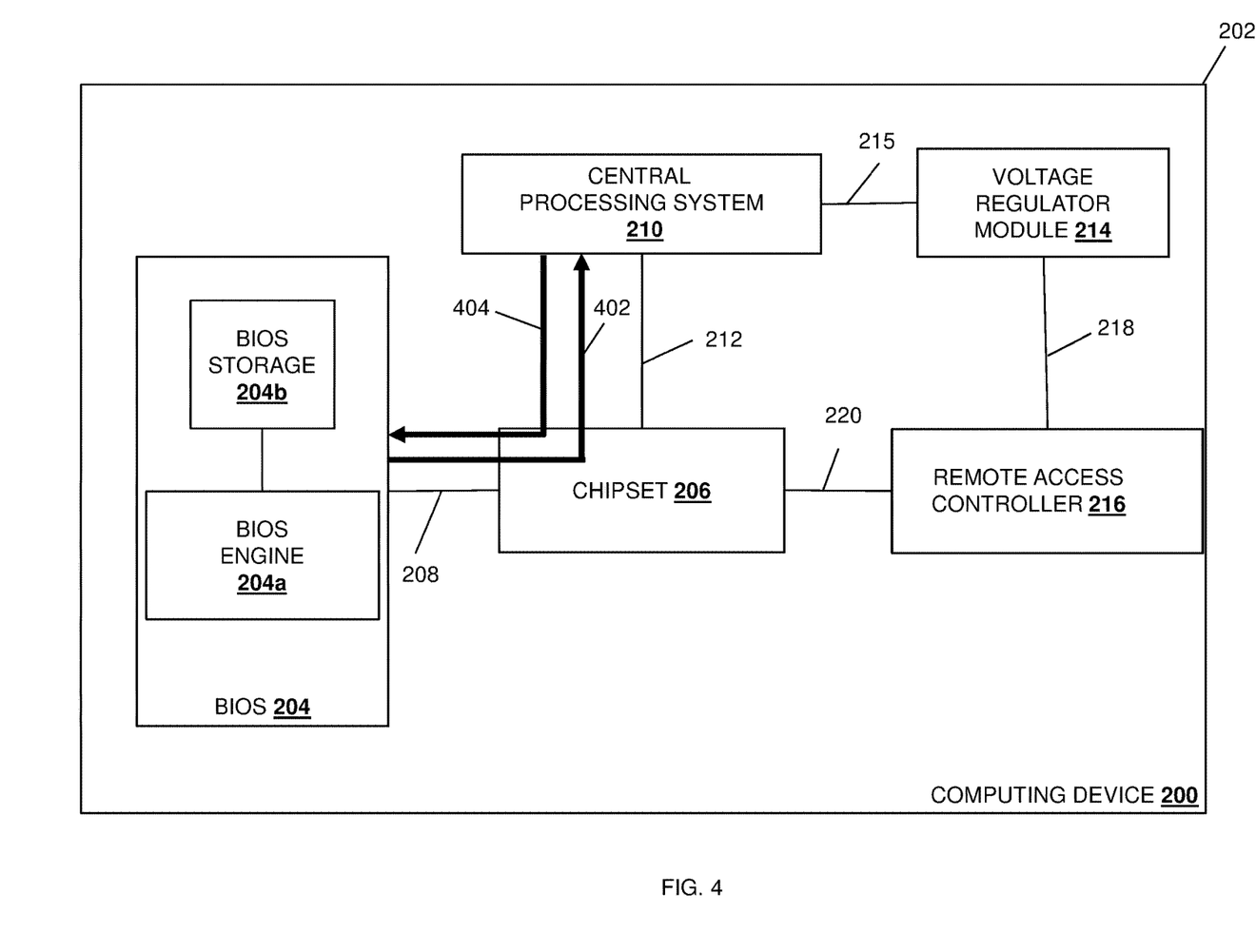
FIG. 4 is a schematic view illustrating an embodiment of communications in the computing device of FIG. 2 to configure a voltage regulator during the method of FIG. 3.

The method 300 begins at block 302 where a processing system mode in which a central processing system is operating is identified. In an embodiment, at block 302, the BIOS 204 may identify a processing system mode in which the central processing system 210 is operating. With reference to FIG. 4, a specific example of the computing device 200 operating during block 302 is illustrated. As illustrated, the BIOS 204 may issue a request 402 (e.g., a call GetCpuVrData( )) to the central processing system 210 for the processing system mode in which it is operating. In some embodiments, the processing system mode in which a central processing system 210 is operating may include the number of central processing system cores that are operating on the central processing system 210, as well as any other central processing system information about the central processing system 210 that one of skill in the art in possession of the present disclosure would recognize as capable for use in configuring the voltage regulator module 214. In an embodiment, the request 402 may be provided to the central processing system 210 via the coupling 208, the chipset 206, and the coupling 212. For example, the BIOS 204 may read the number of cores operating on the central processing system 210 from a central processing system register. As illustrated, the BIOS 204 may receive a response 404 from the central processing system 210 including the processing system mode in which the central processing system 210 operating via the coupling 208, the chipset 206, and the coupling 212.

The method 300 then proceeds to block 304 where a voltage regulator module configuration for a voltage regulator module is identified based on the processing system mode. In an embodiment, at block 304, the BIOS 204 may identify a voltage regulator module configuration for the voltage regulator module 214 based on the processing system mode received at block 302. In an embodiment, the BIOS 204 may compare central processing system information that is included in the processing system mode to central processing system information that is mapped to a plurality of voltage regulator module configurations stored in the BIOS storage 204b and, in response, identify a voltage regulator module configuration that is included in the plurality of voltage regulator module configurations stored in the BIOS storage 204b and that should be used to configure the voltage regulator module 214. For example, the BIOS engine 204a may compare the number of cores that are operating in central processing system 210 (or that are included in the central processing system 210) to the number of cores mapped to each voltage regulator module configuration stored in the BIOS storage 204b, and when the number of cores identified in the processing system mode matches a number of cores mapped to a particular voltage regulator module configuration stored in the BIOS storage 204b, the BIOS engine 204a identifies that voltage regulator module configuration as the voltage regulator module configuration that will be used to configure the voltage regulator module 214.

In an embodiment, the voltage regulator module configuration may include voltage regulator module load-line data that may be used to configure a load-line value associated with the voltage regulator module 214, an initial voltage regulator module output voltage for the voltage regulator module 214, and/or any other voltage regulator module configurations that would be apparent to one of skill in the art in possession of the present disclosure. One of skill in the art will recognize that a voltage regulator module output voltage provided from the voltage regulator module 214 to the central processing system 210 is not fixed, and rather will vary with load change/current draw by the central processing system 210. For example, the voltage regulator module 214 may operate by adjusting the voltage regulator module output voltage according to Equation 1 below:

$$V\text{out} = V\text{initial} - Icc * \text{Loadline},$$

where "Vout" is the voltage regulator module output voltage, "Vinitial" is the initial voltage regulator module output voltage when no load is present and is based on the number of cores in the central processing system 210, "Icc" is the amount of current that the central processing system 210 is pulling from the voltage regulator module 214, and "Loadline" is the resistance or rate at which Vinitial decreases as Icc increases toward Iccmax (e.g., the maximum amount of current that the central processing system 210 is pulling from the voltage regulator module 214).

In a specific example, an eight-core central processing system may require a voltage regulator module configuration where the initial voltage regulator output voltage is 1.54 V when Icc=0A, and the voltage regulator output voltage decreases to a load-line value of 1.6 mOhm as Icc increases. Furthermore, the eight-core central processing system may have a full Iccmax loading at 193 A. Thus, based on the equation above, the voltage regulator module 214 would have an output voltage profile where the voltage regulator module output voltage is between 1.236 V and 1.54 V for an eight-core central processing system. In another specific example, a six-core central processing system may require a voltage regulator module configuration where the initial voltage regulator output voltage is 1.34 V when Icc=0A, and the voltage regulator output voltage decreases according to a load-line value of 2.1 mOhm as Icc increases. Furthermore, the six-core central processing system may have a full Iccmax loading at 138A. Thus, based on the equation above, the voltage regulator module 214 would have a voltage regulator module output voltage of between 1.05 V and 1.34 V for a six-core central processing system. However, while a few specific examples are provided, one of skill in the art in possession of the present disclosure will appreciate that output voltages may be determined for any of a variety of central processing systems having any of a variety of configurations while remaining within the scope of the present disclosure as well.

Figure 5:
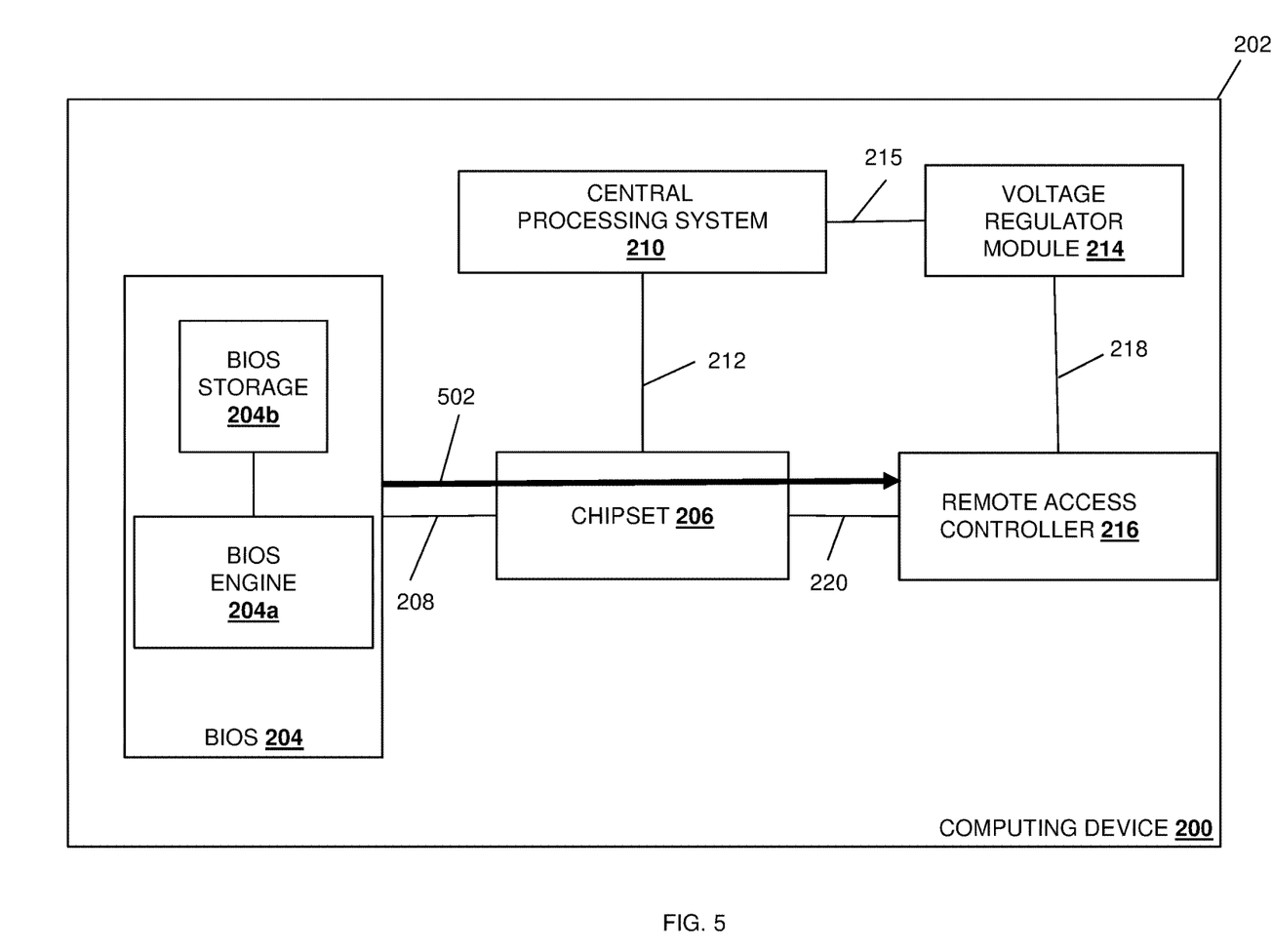
FIG. 5 is a schematic view illustrating an embodiment of communications in the computing device of FIG. 2 to configure a voltage regulator during the method of FIG. 3.

The method 300 then proceeds to block 306 where a voltage regulator module configuration command that includes the voltage regulator module configuration is transmitted to a remote access controller. In an embodiment, at block 306, the BIOS 204 may transmit a voltage regulator module configuration command to the remote access controller 216. As illustrated in FIG. 5, the BIOS engine 204a may transmit a voltage regulator module configuration command 502 to the remote access controller 216 via the coupling 208, the chipset 206, and the coupling 220. For example, the voltage regulator module configuration command 502 may be an Intelligent Platform Management Interface (IPMI) command that is provided on the Low Pin Count (LPC) bus and/or the Enhanced Serial Peripheral Interface (eSPI) bus to the remote access controller 216.

This IPMI command may be specific for transmitting load-line data. In an embodiment, the voltage regulator module configuration command 502 may include the voltage regulator module configuration that was identified by the BIOS 204. However, one of skill in the art in possession of the present disclosure will recognize that other types of communication pathways and protocols may be used to communicate the voltage regulator module configuration from the BIOS 204 to the remote access controller 216 without departing from the scope of the present disclosure.

Figure 6:
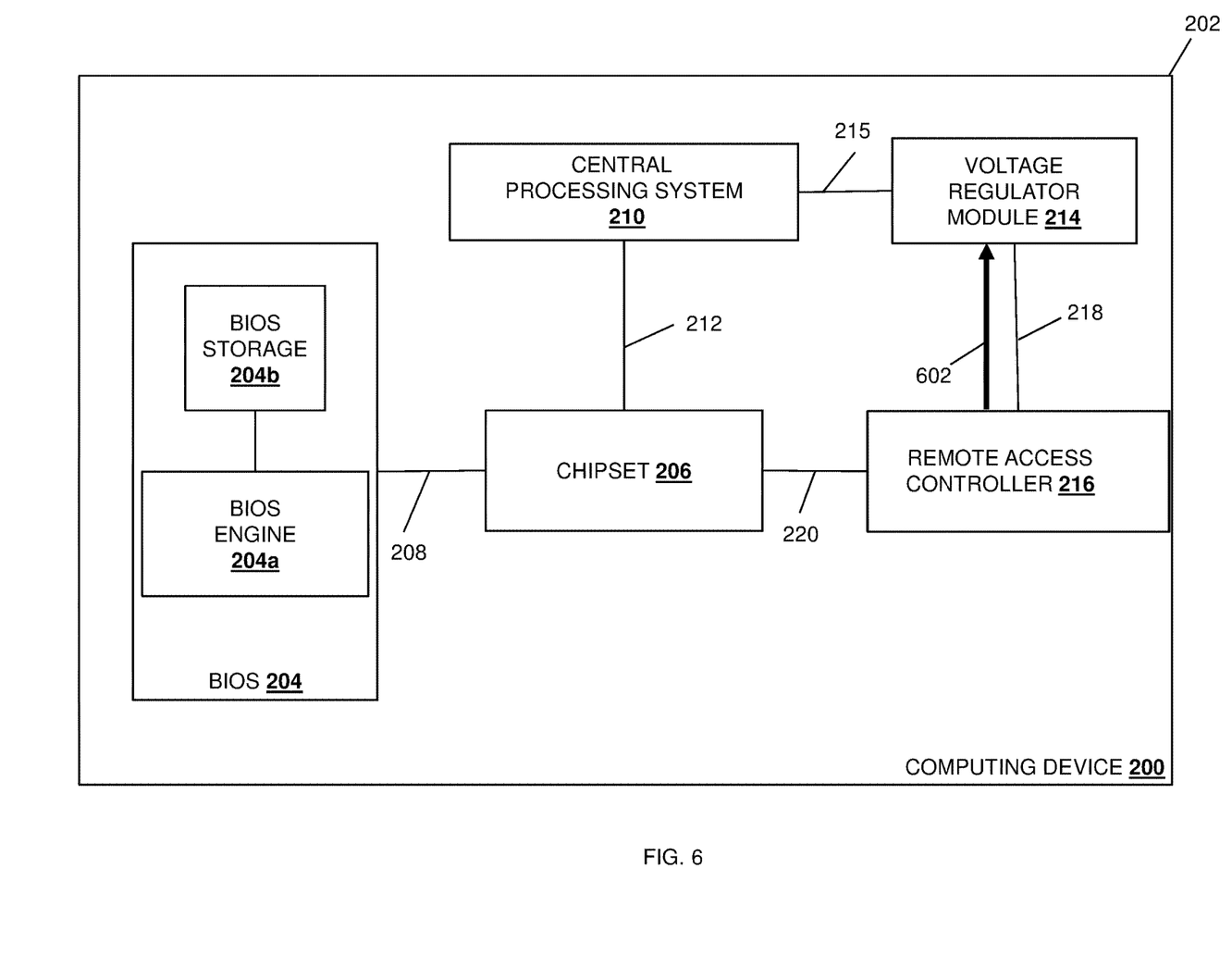
FIG. 6 is a schematic view illustrating an embodiment of communications in the computing device of FIG. 2 to configure a voltage regulator during the method of FIG. 3.

The method 300 then proceeds to block 308 where the voltage regulator module is configured with the voltage regulator module configuration. In an embodiment, at block 308, the remote access controller 216 may receive the voltage regulator module configuration command 502 that includes the voltage regulator module configuration. For example, the remote access controller 216 may access the voltage regulator module 214 via the coupling 218 and configure the voltage regulator module 214 with the voltage regulator module configuration. As illustrated in FIG. 6, the remote access controller 216 may perform a voltage regulator module update 602 using the voltage regulator module configuration that may include the voltage regulator module load-line data, the initial voltage regulator output voltage data, and/or any other voltage regulator module configuration that would be apparent to one of skill in the art in possession of the present disclosure, and the remote access controller 216 may provide that voltage regulator module update 602 via the coupling 218. For example, the remote access controller 216 may use the PMBus protocol and/or the I2C protocol to communicate the voltage regulator module update 602 over the coupling 218. In some examples, at block 308, the voltage regulator module update 602 may update stored voltage regulator module configurations with the voltage regulator module configurations in the voltage regulator module update 602. For example, the remote access controller 216 may directly update registers in the voltage regulator module 214 with the voltage regulator module load-line data and/or the initial voltage regulator output voltage data discussed above. However, in other examples, the remote access controller 216 may provide the voltage regulator module update 602 to a voltage regulator module controller included in the voltage regulator module 214, and the voltage regulator module controller may then update the registers that correspond with the voltage regulator module configurations in the voltage regulator module update 602.

The method 300 then proceeds to block 310 where a voltage that is dependent on the voltage regulator module configuration is provided to the central processing system. In an embodiment, at block 310, the voltage regulator module 214 may provide an output voltage (Vout) to the central processing system 210 via the coupling 215 that is based on the voltage regulator module configuration that was provided to the voltage regulator module 214 by the BIOS 204 and the remote access controller 216 as discussed above. As discussed above, Vout may be based on the initial voltage and/or the load-line value for the central processing system mode in which the central processing system 210 is operating, or in which the central processing system 210 will subsequently operate after the central processing system 210 becomes operational following the initial boot of the computing device 200.

Thus, systems and methods have been described that provide for configuration of a voltage regulator module in a computing device during a boot process that allows the BIOS to configure a voltage regulator module for a particular central processing system and/or a particular central processing system mode in which a central processing system is operating. For example, the BIOS may determine the number of cores included in the central processing system or that will be used by the central processing system during runtime, and uses that information to determine a voltage regulator module configuration for that central processing system. The BIOS may then provide the voltage regulator module configuration to a remote access controller that then accesses the voltage regulator module to configure the voltage regulator module with the voltage regulator module configuration. As such, the BIOS and the remote access controller may be used to configure the voltage regulator module during boot of the computing device, and eliminates the need to require that the central processing system to continuously run a workload that adjusts the voltage of the voltage regulator module as is performed in conventional computing devices, thus providing enhanced central processing system performance and reduced power consumption relative to conventional computing devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A voltage regulator configuration system, comprising:
   a processing system;
   a voltage regulator module that is coupled to the processing system and that is configured to provide a voltage to the processing system;
   a Basic Input/Output System (BIOS) that is coupled to the processing system and that is configured to:
      identify a processing system mode in which the processing system is operating;
      identify, based on the processing system mode, a voltage regulator module configuration for the voltage regulator module; and
      transmit a voltage regulator module configuration command that includes the voltage regulator module configuration; and
   a remote access controller that is coupled to the BIOS and the voltage regulator module, wherein the remote access controller is configured to:
      receive the voltage regulator module configuration command; and
      configure the voltage regulator module with the voltage regulator module configuration.

2. The system of claim 1, wherein the voltage regulator module is configured to:
   output a voltage to the processing system that is dependent on the voltage regulator module configuration.

3. The system of claim 1, wherein the identifying the processing system mode, the identifying the voltage regulator module configuration, and the transmitting the voltage regulator module configuration command is performed during initial boot operations controlled by the BIOS.

4. The system of claim 1, wherein the voltage regulator module configuration command is included in an Intelligent Platform Management Interface (IPMI) command that is provided on at least one of a Low Pin Count (LPC) bus or an Enhanced Serial Peripheral Interface (eSPI) bus.

5. The system of claim 1, wherein the configuration of the voltage regulator module with the voltage regulator module configuration by the remote access controller is performed over a management bus using at least one of an inter-integrated circuit (I²C) protocol or a Power Management Bus (PMBus) protocol.

6. The system of claim 1, wherein the identifying the processing system mode includes determining a number of processing cores included in the processing system that are set to perform processing operations.

7. The system of claim 1, wherein the voltage regulator module configuration includes a targeted load-line value.

8. An Information Handling System (IHS), comprising:
a Basic Input/Output System (BIOS) processing system; and
a BIOS memory system that is coupled to the BIOS processing system and that includes instructions that, when executed by the processing system, causes the BIOS processing system to provide a BIOS that is configured, during a boot process, to:
identify a central processing system mode in which a central processing system coupled to the BIOS will operate;
identify, based on the central processing system mode, a voltage regulator module configuration for a voltage regulator module that is coupled to a central processing system; and
transmit, to a remote access controller that is coupled to the BIOS, a voltage regulator module configuration command that includes the voltage regulator module configuration, wherein the voltage regulator module configuration command is configured to cause the remote access controller to configure the voltage regulator module with the voltage regulator module configuration.

9. The IHS of claim 8, wherein the voltage regulator configuration causes the voltage regulator module to output a voltage to the central processing system that is dependent on the voltage regulator module configuration.

10. The IHS of claim 8, wherein the voltage regulator module configuration command is included in an Intelligent Platform Management Interface (IPMI) command that is provided on at least one of a Low Pin Count (LPC) bus or an Enhanced Serial Peripheral Interface (eSPI) bus.

11. The IHS of claim 8, wherein the configuration of the voltage regulator module with the voltage regulator module configuration by the remote access controller is performed over a management bus using at least one of an inter-integrated circuit (I²C) protocol or a Power Management Bus (PMBus) protocol.

12. The IHS of claim 8, wherein the identifying the central processing system mode includes determining a number of processing cores included in the central processing system that are set to perform central processing operations.

13. The IHS of claim 8, wherein the voltage regulator module configuration includes a targeted load-line value.

14. A method for configuring a voltage regulator module, comprising:
identifying, by a Basic Input/Output System (BIOS), a processing system mode in which a processing system that is coupled to the BIOS is operating;
identifying, by the BIOS and based on the processing system mode, a voltage regulator module configuration for a voltage regulator module coupled to the processing system; and
providing, by the BIOS, a voltage regulator module configuration command that includes the voltage regulator module configuration to a remote access controller that is coupled to the BIOS and the voltage regulator module, wherein the voltage regulator module configuration command causes the remote access controller to configure the voltage regulator module with the voltage regulator module configuration.

15. The method of claim 14, further comprising:
outputting, by the voltage regulator module, a voltage to the processing system that is dependent on the voltage regulator module configuration.

16. The method of claim 14, wherein the identifying the processing system mode, the identifying the voltage regulator module configuration, and the providing the voltage regulator module configuration command is performed during initial boot operations controlled by the BIOS.

17. The method of claim 14, wherein the voltage regulator module configuration command is included in an Intelligent Platform Management Interface (IPMI) command that is provided on at least one of a Low Pin Count (LPC) bus or an Enhanced Serial Peripheral Interface (eSPI) bus.

18. The method of claim 14, wherein the configuration of the voltage regulator module with the voltage regulator module configuration by the remote access controller is performed over a management bus using at least one of an inter-integrated circuit (I²C) protocol or a Power Management Bus (PMBus) protocol.

19. The method of claim 14, wherein the identifying the processing system mode includes determining, by the BIOS, a number of processing cores included in the processing system that are set to perform processing operations.

20. The method of claim 14, wherein the voltage regulator module configuration includes a targeted load-line value.

* * * * *